US008325280B2

United States Patent
Prieto et al.

(10) Patent No.: US 8,325,280 B2
(45) Date of Patent: Dec. 4, 2012

(54) DYNAMIC COMPENSATION OF DISPLAY BACKLIGHT BY ADAPTIVELY ADJUSTING A SCALING FACTOR BASED ON MOTION

(75) Inventors: Yolanda Prieto, Coral Gables, FL (US); Zhongli He, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 398 days.

(21) Appl. No.: 12/536,963

(22) Filed: Aug. 6, 2009

(65) Prior Publication Data

US 2011/0032430 A1    Feb. 10, 2011

(51) Int. Cl.
*H04N 5/57* (2006.01)
(52) U.S. Cl. .................. 348/687; 345/102; 375/240.01
(58) Field of Classification Search ............ None
See application file for complete search history.

(56) References Cited

U.S. PATENT DOCUMENTS

| 7,154,468 | B2 | 12/2006 | Linzmeier et al. |
| 7,173,599 | B2 | 2/2007 | Nishimura |
| 2006/0153296 | A1* | 7/2006 | Deng ............... 375/240.12 |
| 2009/0002564 | A1* | 1/2009 | Barnhoefer et al. ...... 348/687 |

* cited by examiner

*Primary Examiner* — Sath V Perungavoor
*Assistant Examiner* — Mohammed Jebari
(74) *Attorney, Agent, or Firm* — Gary Stanford

(57) ABSTRACT

A video adjustment system for processing video information is disclosed which includes a motion analyzer and an adjustment module. The motion analyzer determines a motion level metric of the video information based on at least one motion parameter. The adjustment adjusts an initial dynamic light scaling factor to provide an adjusted dynamic light scaling factor based on the motion level. The dynamic light scaling factor may be used for luminance compensation and backlight display scaling. The motion level may be based on any type of motion information, such as motion vector information or information indicating a scene change. A distortion module may perform a distortion evaluation of the video information for calculating the initial scaling factor. Alternatively, the distortion module may include a memory which stores predetermined scaling factors based on statistical distortion level characterization.

21 Claims, 3 Drawing Sheets

DYNAMIC COMPENSATION OF DISPLAY BACKLIGHT BY ADAPTIVELY ADJUSTING A SCALING FACTOR BASED ON MOTION

BACKGROUND OF THE INVENTION

1. Field of the Invention

The present invention relates in general to video information processing, and more specifically to dynamic compensation of display backlight by adaptively adjusting a dynamic light scaling factor based on motion information.

2. Description of the Related Art

Backlight dimming is one method for power reduction in liquid-crystal displays (LCDs) of battery-powered devices. Power consumption of the backlight is proportional to its luminance. The principal of dynamic light scaling (DLS) to save power by backlight dimming involves restoring the brightness of the image with appropriate image compensation so the user perceives similar levels of brightness and contrast with minor perceived image distortion. One method involves determining a scaling factor based on the video information and applying the scaling factor for luminance compensation and backlight scaling. As the scaling factor is increased, power consumption is reduced at a cost of increased distortion of the displayed images. The scaling factor is adjusted between minimum and maximum levels to provide optimal quality of service (QoS) for a given level of available power.

BRIEF DESCRIPTION OF THE DRAWINGS

The benefits, features, and advantages of the present invention will become better understood with regard to the following description, and accompanying drawings where.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

The present disclosure describes video information processing systems according to exemplary embodiments. It is intended, however, that the present disclosure apply more generally to any of various types of "video information" including video sequences (e.g. MPEG) or image sequencing information, such as, for example, JPEG (Joint Photographic Experts Group), motion JPEG (MJPEG), JPEG2000, motion JPEG2000 (MJPEG2000), etc. The term "video information" as used herein is intended to apply to any video or image sequence information.

Figure 1:
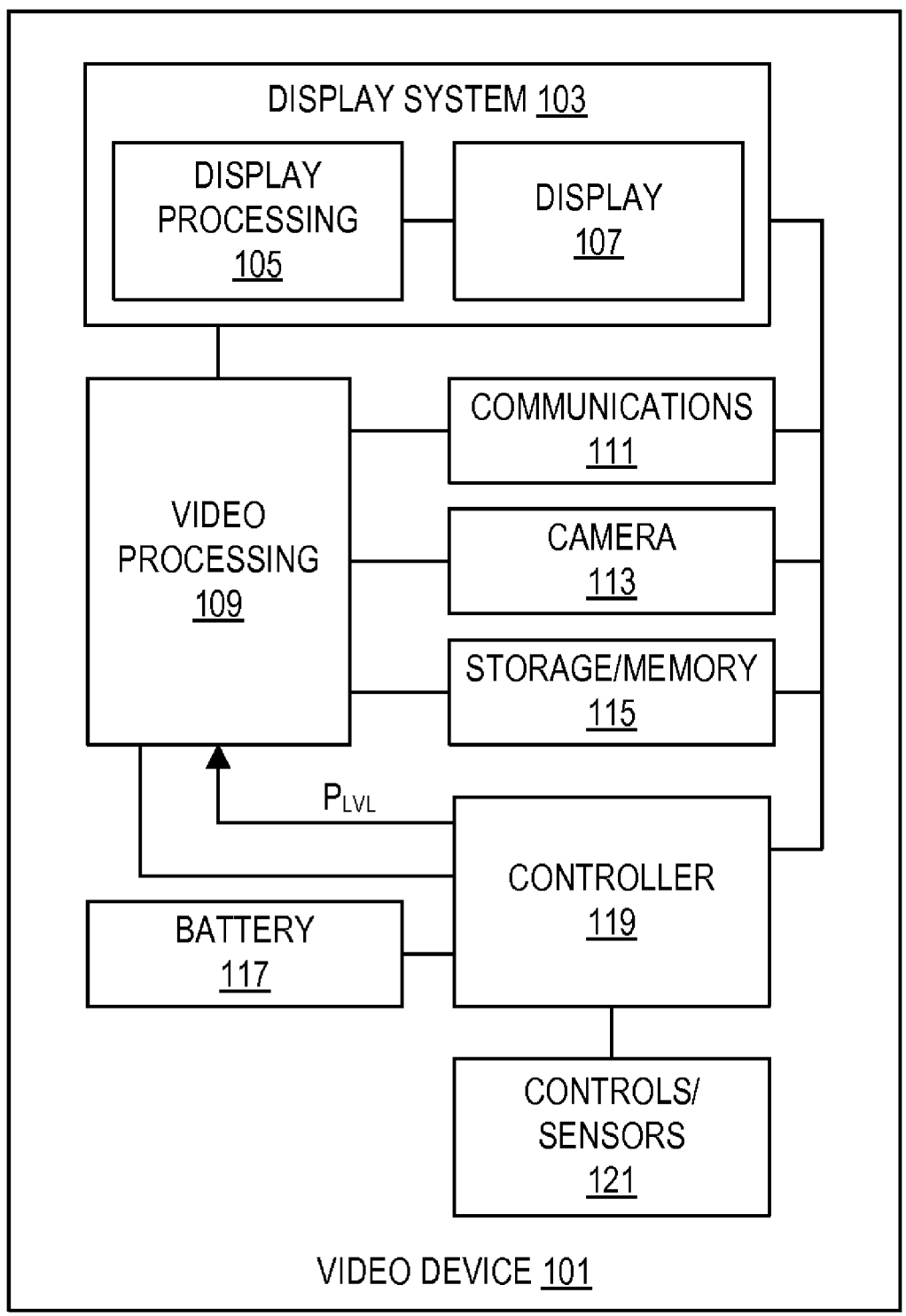
FIG. 1 is a simplified block diagram of a battery-powered, handheld video device according to an exemplary embodiment.

FIG. 1 is a simplified block diagram of a battery-powered, handheld video device 101 according to an exemplary embodiment. The video device 101 is implemented according to any suitable configuration, such as a personal digital assistant (PDA), a cellular phone (or cell phone), a smart phone, a video camera, etc. The video device 101 includes a display system 103 which further includes a display processing module 105 and a display device 107 for displaying video information. The video device 101 includes a video processing module 109, a communications module 111, a camera 113, storage/memory 115, a battery 117, a controller 119, and various controls and sensors 121. The controls and sensors 121 includes any one or more of input devices, such as keyboards, buttons, switches, slide switches, trackballs, etc. The controls and sensors 121 may further include a light sensor for sensing ambient light conditions or manual switches or other controls or the like for operating the video device 101 in various lighting conditions. The communications module 111 is configured for wired and/or wireless communications with external devices, such as cell phones or computers or the like. The storage/memory 115 incorporates any combination of random access memory (RAM) or read-only memory (ROM) or the like, and further may include any combination of internal or external memory devices, such as a memory stick or plug-in memory card or the like. The storage/memory 115 may further include other types of storage, such as a hard drive, magnetic tape storage, flash memory, etc., for storing data and information including video information. The controller 119 is coupled to the other modules and components for controlling the various functions of the video device 101 according to desired functions or mode of operation. The controller 119 incorporates power management circuitry for monitoring the level of the battery 117 and for providing a corresponding power level ($P_{LVL}$) signal, shown provided to the video processing module 109. The $P_{LVL}$ signal may be a continuous-time type or analog variable between minimum and maximum values. Alternatively, the $P_{LVL}$ signal may be a digital or discrete variable with discrete steps or values between minimum and maximum values.

The video processing module 109 receives and processes video information from any one of multiple sources and provides video information to the display system 103 for display. Encoded video information is received from an external device via the communications module 111 and forwarded to the video processing module 109. The video processing module 109 decodes the received video information and provides decoded video information to the display system 103. The camera 113 provides video information to the video processing module 109. In one embodiment, the camera 113 provides video information in YUV image format, including luma (Y) information and chroma (UV) information, to the video processing module 109. The video processing module 109 includes a video encoder which encodes the YUV video information for storage by the storage/memory 115. The YUV video information from the camera 113 may be provided to the display processing module 105, which converts the YUV format to red/green/blue (RGB) format for preview display on the display 107 for a video camera. Alternatively, the encoded video from the video processing module 109 may also be decoded to YUV format in real-time and provided to the display system 103 for display. In playback mode, the stored encoded video information is provided to the video processing module 109, which includes a video decoder which decodes the video information and provides the decoded video information to the display system 103 for display. Although not shown, in one embodiment the camera 113 includes a sensor (e.g., a charged coupled device or CCD) which provides "raw" video information, such as in the red/green format RGRGRGRG . . . for the first row and the green/blue format GBGBGBGB . . . for the second row, and so on. In one embodiment, the camera 113 further includes a pre-processing module (not shown) which performs various conversion functions (e.g., color processing, gamma correction, etc.) to convert the raw video into the YUV format video information. Alternatively, the pre-processing module may be incorporated within the video processing module 109.

During the encoding process, each video picture or frame is subdivided and encoded at a video block (VB) level. A VB is any suitable grouping of picture elements or "pixels", such as 4×4, 4×8, 8×4, 8×8, 16×16, etc. MPEG video is typically subdivided into macroblocks, in which each macroblock (MB) incorporates 16×16 pixels. Each VB is encoded in "intraframe" mode in which a prediction video block is formed based on reconstructed video blocks in the current frame, or "interframe" mode in which a prediction video block is formed during motion estimation based on reference video blocks from one or more reference frames. The intraframe encoding mode applies spatial information within the current frame in which the prediction video block is formed from samples in the current frame that have previously encoded, decoded and reconstructed. The interframe encoding mode utilizes temporal information from previous and/or future reference frames to estimate motion to form the prediction video block. For coding purposes, the video information is typically partitioned into frames which are further partitioned into slices, in which each video slice incorporates one or more video blocks. The video information is typically processed and/or stored or transmitted in slices. Video information may be processed according to other types of frame partitions, such as tiles or regions or other groups of pixels. A frame may be subdivided into equal-sized or variable-sized regions including one or more regions of interest. Any given region incorporates an array of pixels or a grouping of video blocks or the like depending upon one or more video characteristics or according to a predetermined size grouping. A "subframe" generally refers to any suitable frame partition, such as VB, slice, region, etc.

Figure 2:
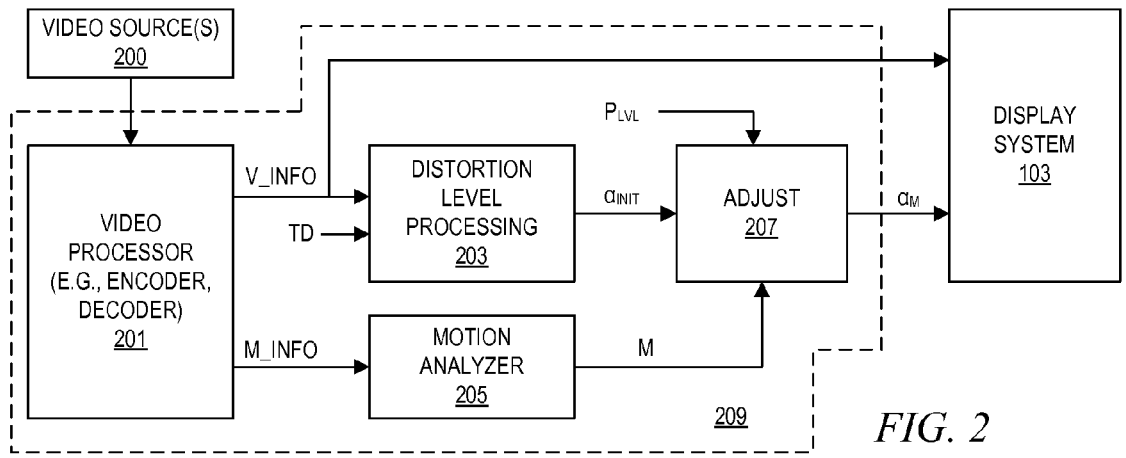
FIG. 2 is a block diagram of a video processing module illustrating one embodiment of the video processing module of FIG. 1.

FIG. 2 is a block diagram of a video processing module 209 illustrating one embodiment of the video processing module 109. Video information from any one of one or more video sources 200 is provided to a video processor 201, which provides decoded video information V_INFO to the display system 103 for display. The video processor 201 may include a video encoder for encoding YUV video information (e.g., from the camera 113 or other video source) for storage and/or display. The video processor 201 includes a video decoder which decodes encoded video information to provide the decoded video information V_INFO to the display system 103. The decoded video information V_INFO is also provided to a distortion level processing module 203, which also receives a target distortion (TD) value and which provides a corresponding initial dynamic light scaling factor $\alpha_{INIT}$ to adjust module 207. The video processor 201 further provides motion information M_INFO to a motion analyzer 205, which provides a motion parameter M to the adjust module 207. The adjust module 207 also receives the $P_{LVL}$ signal, and provides a motion adjusted dynamic light scaling factor $\alpha_M$ to the display system 103. The display system 103 adjusts one or more display parameters for displaying the V_INFO using the adjusted scaling factor $\alpha_M$.

Figure 3:
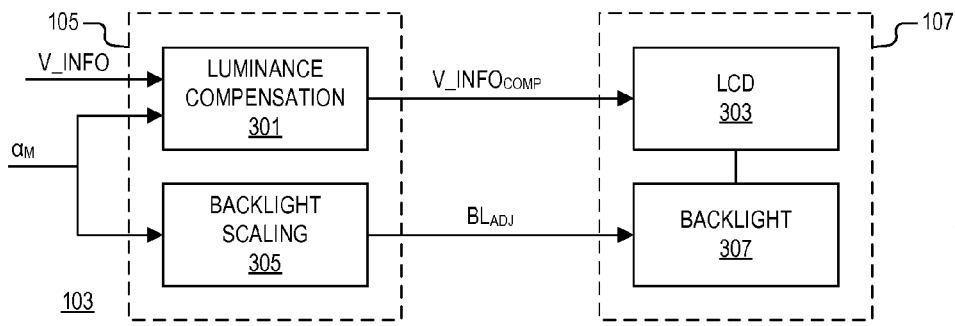
FIG. 3 is a more detailed block diagram of the display system including the display processing module and the display device of FIG. 1.

FIG. 3 is a more detailed block diagram of the display system 103 including the display processing module 105 and the display device 107. The display processing module 105 includes a luminance compensation module 301 and backlight scaling circuitry 305, and the display device 107 includes a liquid-crystal display (LCD) 303 and a corresponding backlight 307. The luminance compensation module 301 receives V_INFO and the adjusted scaling factor $\alpha_M$ and provides compensated video information V_INFO$_{COMP}$ to the LCD 303 for display. The luminance compensation module 301 compensates or adjusts the level of luminance or intensity of the video information V_INFO based on the adjusted scaling factor $\alpha_M$. The backlight scaling circuitry 305 receives the adjusted scaling factor $\alpha_M$ and provides an adjusted backlight control signal BL$_{ADJ}$ to backlight 307. The level of backlight illumination is adjusted based on the adjusted scaling factor $\alpha_M$. One method of reducing power consumption of the video device is to adjust the backlight control signal BL$_{ADJ}$ to reduce backlight illumination, which might otherwise reduce the Quality of Service (QoS) or the quality of the displayed video images. V_INFO$_{COMP}$ is adjusted to compensate for adjustments to the backlight 307.

Referring to FIGS. 2 and 3, the distortion level processing module 203 attempts to provide the initial scaling factor $\alpha_{INIT}$ to dynamically scale the backlight 307 with minimal impact on the QoS for the diplayed video information. One approach for implementation of the distortion level processing module 203 is a distortion histogram analysis on the video information provided in YUV image format. According to this method, the frame pixels are used to compute luminance distortion histograms of the original image or the pre-processed image. In one embodiment, the computed distortion histogram takes into account the amount of saturated pixels for a given scaling factor. The scaling factor is applied to the luma (Y) component of the image in order to maintain a target luminance. The optimal scaling factor depends on video content and thus it can vary on a frame-by-frame, region-by-region or even a VB-by-VB basis. Consequently, determining an optimal scaling factor includes an accurate video analysis. In one embodiment, the value of the scaling factor is selected on a frame-by-frame analysis based on the distortion histogram of the entire frame or on a region of a frame by using multiple histograms to enable a more spatially accurate luminance within a given frame. The distortion level processing module 203, however, determines distortion level "online" or while the video information is being processed within the video device 101 with limited power and processing capacity resources. Thus, a limited amount of computation complexity is available during such online processing, so that the distortion level processing may not be too complex to avoid consumption of the limited resources. In one embodiment, such online processing is not based on the Human Visual System (HVS) because of the limited processing capacity.

It has been determined that the initial scaling factor $\alpha_{INIT}$ results in significant image quality degradation for video with higher motion or during a scene change. Higher motion video may be indicated by various factors, such as larger motion vectors or mean sum of absolute difference (MAD) information. A scene change may be indicated by various factors. In one embodiment, for example, a scene change is determined based on the relative amount of intraframe coded information for a given frame. The motion analyzer 205 uses motion information of the video information to determine the level of motion or to detect a scene change. The adjust module 207 adaptively modifies the initial scaling factor $\alpha_{INIT}$ based on the motion information at a desired rate or interval, such as region-by-region, VB-by-VB (e.g., MB-by-MB), slice-by-slice, frame-by-frame, or "multiframe" (after each of a number N of frames). If there is a significant amount of motion or when a scene change is detected, then the initial scaling factor $\alpha_{INIT}$ is modified to provide the adjusted scaling factor $\alpha_M$ in order to reduce detrimental impact of the quality of the image during higher motion level or scene change. The motion adapted or adjusted scaling factor $\alpha_M$ is provided instead to the display system 103. The adapted scaling factor $\alpha_M$ appropriately adjusts backlight scaling and luminance compensation resulting in improved image quality during higher motion or scene changes.

Figure 4:
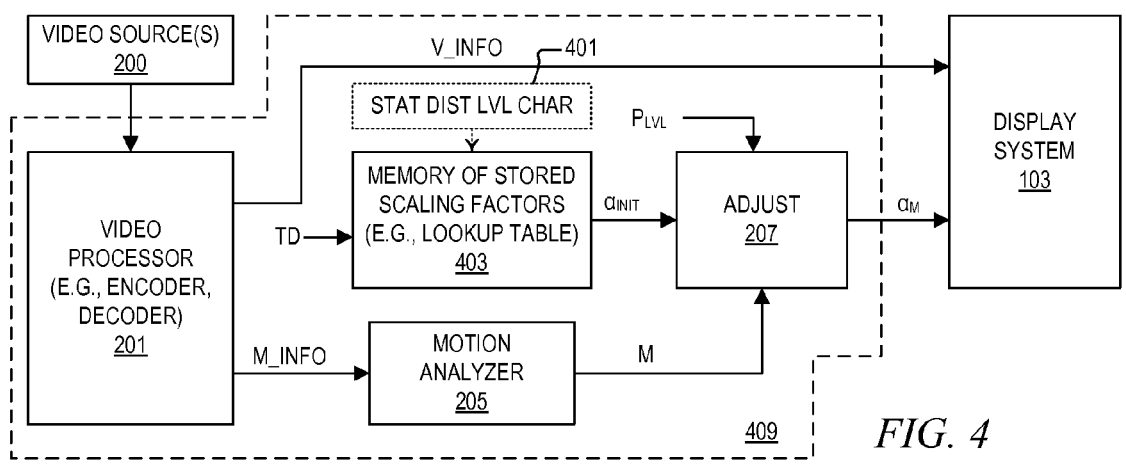
FIG. 4 is a block diagram of a video processing module illustrating an alternative embodiment of the video processing module of FIG. 1 in which distortion is computed off-line as result of statistical analysis.

FIG. 4 is a block diagram of a video processing module 409 illustrating an alternative embodiment of the video processing module 109 in which distortion is computed off-line as result of statistical analysis. In this case, the distortion level processing module 203 is replaced with a memory device 403 storing multiple scaling factors for each expected level or value of the TD value. In one embodiment, the memory device 403 includes or is implemented as a lookup table (LUT) or the like. Thus, the memory device 403 outputs an initial scaling factor $\alpha_{INIT}$ for each corresponding value of TD. The stored scaling factors are determined by a statistical distortion level characterization, represented as a block 401. The statistical analysis of block 401 may include, for example, evaluation of various images and videos at various frame levels under various lighting conditions. The statistical distortion evaluation provides a benefit as compared to the image dependent approach in that it is based on HVS to achieve superior results. For example, after the pre-processing phase, the down-sampled and YUV converted image is fed to a frame-processing step in which each pixel is used to compute luminance histograms of the pre-processed image. The histograms computed take into account the amount of saturated pixels for a given scaling factor. This approach is slightly different from creating a histogram which accounts the number of pixels for a given luminance value. In the offline approach, the amount of distortion for a given scaling factor may be directly determined by indexing the histogram. Consequently, critical regions in the image are easily recognizable and discerned. In one embodiment, once the histograms are created, they are scanned starting from bright region and, when the distortion threshold is reached, the optimal luminance scaling factors for each histogram are found. In this case, the distortion may be defined as the total number of saturated pixels after image compensation. The distortion threshold is set based on the target QoS and the amount of power saving desired, having various images and video tested using the statistical analysis approach. It is noted that the distortion threshold may vary from frame to frame and it also depends on the lighting conditions. For example, with a more aggressive distortion threshold setting, a better power saving on the entire video may be achieved.

Figure 5:
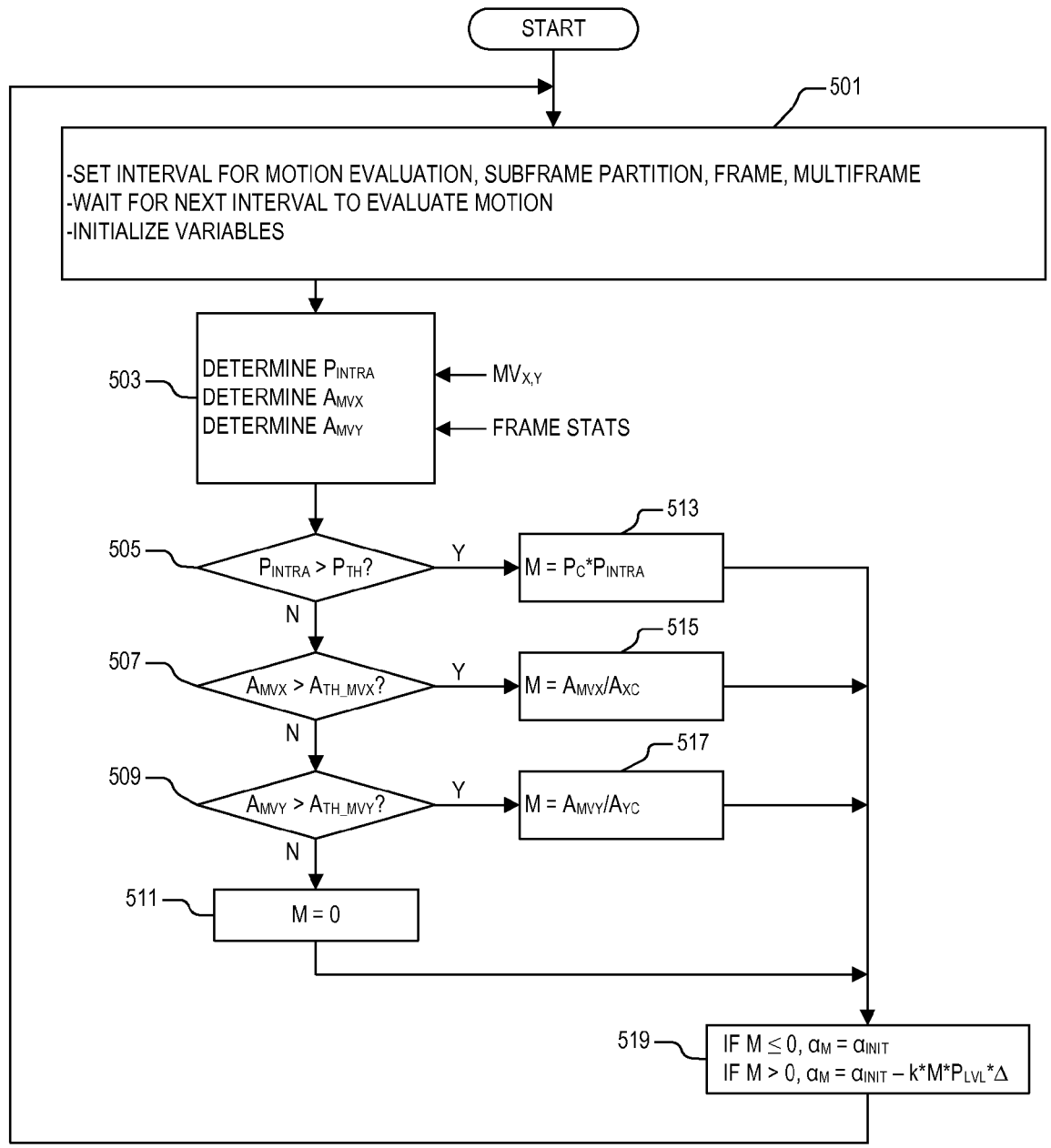
FIG. 5 is a flowchart diagram illustrating operation of the video processing module of the video device of FIG. 1 according to an exemplary embodiment.

FIG. 5 is a flowchart diagram illustrating operation of the video processing module 109 of the video device 101 according to an exemplary embodiment. Illustrated operation is primarily based at the motion analyzer 205 and the adjust module 207, and operation is substantially the same for either video processing module 209 or 409. At first block 501, an interval is set for motion evaluation. The motion evaluation interval is set statically (fixed) or dynamically (on-the-fly) depending upon the particular implementation. The interval is any one of a subframe partition, such as a region-of-interest, or at a region-by-region level, the VB or video slice level, the frame level (frame-by-frame), or multiframe (every Nth frame in which N is a positive integer). N is either a static variable (fixed) or a dynamic variable determined in real-time. A subframe partition interval may be more suitable for the video processing module 409 with a sufficient processing capacity. As available processing capacity is reduced, the interval may be increased accordingly to reduce the amount of processing to conserve processing cycles in a dynamic configuration. For example, if the interval is frame-by-frame and the available processing capacity is decreased or otherwise insufficient, the interval is increased to multiframe, which means every Nth frame (e.g., every $2^{nd}$ frame, every $5^{th}$ frame, etc.).

Variables are initiated at block 501 and operation proceeds to block 503 to determine values for each of several variables based on input motion vector information $MV_{X,Y}$ and frame statistics (FRAME STATS). The motion vector information $MV_{X,Y}$ incorporates each motion vector of the interframe coded VBs of a given frame, where each motion vector includes an X component and a Y component. The frame statistics provide the total number of VBs coded for the frame being analyzed for motion, along with the total number intraframe coded VBs of the frame. A first variable is $P_{INTRA}$ which is a percentage of the number of intraframe coded VBs of the frame. $P_{INTRA}$ may be determined by dividing the total number intraframe coded VBs by the total number of VBs coded for the frame. A second variable is $A_{MVX}$ which is an average of the X components of the motion vectors of the interframe coded VBs for the frame. A third variable is $A_{MVY}$ which is an average of the Y components of the motion vectors of the interframe coded VBs for the frame. In other embodiments, additional motion information may be determined. For example, during motion estimation while encoding input video, a 'minimum' sum of absolute differences (MSAD) is determined for each VB of a current frame while searching a reference frame for the closest matching reference VB in the reference frame. A SAD value is determined for each VB being searched within a search range, which is a sum of the differences between corresponding pixel values of the current VB and a reference VB. The reference VB having the lowest SAD value, or MSAD, within the applicable search is selected and a corresponding motion vector is determined based on relative displacement between the current and reference VBs. An average or mean of the MSAD values determined for an entire frame, referred to as a MAD value, may be determined for the frame as another motion metric other than the motion vectors.

Operation proceeds to block 505 to determine whether $P_{INTRA}$ is greater than a predetermined threshold value $P_{TH}$. In one embodiment, the threshold value $P_{TH}$ is within a range of 20-30% (or 0.2-0.3) indicating a relatively high level of intraframe coded VBs for a frame. If not, then a scene change is not indicated and operation proceeds to block 507 to determine whether $A_{MVX}$ is greater than a predetermined threshold value $A_{MVX\_TH}$. In one embodiment, $A_{MVX\_TH}$=6 integer pixel units. If not, then significant motion is not indicated in the X direction and operation proceeds to block 509 to determine whether $A_{MVY}$ is greater than a predetermined threshold value $A_{MVY\_TH}$. In one embodiment, $A_{MVX\_TH}$=4 integer pixel units. If not, then significant motion is not detected and operation proceeds to block 511 in which the motion metric is set equal to zero (M=0) and then operation proceeds to block 519 for a determination of $\alpha_M$. Referring back to block 505, if $P_{INTRA}$ is greater than $P_{TH}$, then a scene change is indicated and operation proceeds instead to block 513 in which M is set equal to $P_C*P_{INTRA}$. $P_C$ is a normalizing factor for $P_{INTRA}$ and an asterisk "*" denotes multiplication. In one embodiment, $P_C$=5. From block 513 operation proceeds to block 519 to determine the adjusted scaling factor $\alpha_M$. Referring back to block 507, if $A_{MVX}$ is greater than $A_{MVX\_TH}$, then a significant amount of motion is indicated in the X direction and operation proceeds instead to block 515 in which M is set equal to $A_{MVX}/A_{XC}$. $A_{XC}$ is a normalizing factor for $A_{MVX}$ and a forward slash "\" denotes division. In one embodiment, $A_{XC}$=10. From block 515 operation proceeds to block 519 to determine the adjusted scaling factor $\alpha_M$. Referring back to block 509, if $A_{MVY}$ is greater than $A_{MVY\_TH}$, then a significant amount of motion is indicated in the Y direction and operation proceeds instead to block 517 in which M is set equal to $A_{MVY}/A_{YC}$. $A_{YC}$ is a normalizing factor for $A_{MVY}$. In one embodiment, $A_{YC}$=8. From block 517 operation proceeds to block 519 to determine the adjusted scaling factor $\alpha_M$.

At block 519, if M≦0, then the adjusted scaling factor $\alpha_M$ is set equal to the initial scaling factor $\alpha_{INIT}$. If M>0, then the adjusted scaling factor $\alpha_M$ is based on $\alpha_{INIT}$, a factor k, the motion metric M, the $P_{LVL}$ value, and a parameter $\Delta$. In particular, $\alpha_M = \alpha_{INIT} - k*M*P_{LVL}*\Delta$. M is the motion metric and $P_{LVL}$ is the available power level as previously described. The parameter $\Delta$ is an incremental scaling factor step size based on the selected range of $\alpha_{INIT}$. In one embodiment in which $\alpha_{INIT}$ is within the range [1, 2], $\Delta$ has a step size of 0.15. The factor k is a parameter which controls the overall range of the combined factor $M*P_{LVL}*\Delta$ and to ensure that $\alpha_M$ is greater than its predetermined minimum value, such as greater than or equal to one (1). In one embodiment, k is within the range [0, 1]. After $\alpha_M$ is determined at block 519, operation returns to block 501 for the next interval.

A video adjustment system for processing video information according to one embodiment includes a motion analyzer and an adjustment module. The motion analyzer determines a motion level metric of the video information based on at least one motion parameter. The adjustment module adjusts an initial dynamic light scaling factor to provide an adjusted dynamic light scaling factor based on the motion level. The motion level metric may be based on any type of motion information, such as motion vector information, information indicating a scene change, among other parameters. The video adjustment system may further include a distortion module which performs distortion evaluation of the video information for calculating the initial dynamic light scaling factor based on a target distortion metric. Alternatively, the distortion module may include a memory which stores predetermined scaling factors based on statistical distortion level characterization in which one of the predetermined scaling factors is selected as the initial dynamic light scaling factor by a target distortion metric.

An electronic video device according to one embodiment includes a video processing system, a video adjustment system and a display system. The video processing system provides motion information associated with video information. The video adjustment system determines a dynamic light scaling factor based on a target distortion metric and the motion information. The display system displays adjusted video information which is adjusted based on the dynamic light scaling factor. The display system may include a luminance compensator which adjusts luminance of the video information based on the dynamic light scaling factor. The display system may include a backlight unit which adjusts backlight power based on the dynamic light scaling factor.

A method of processing video information according to one embodiment includes determining a motion level of the video information, and adjusting an initial dynamic light scaling factor to provide an adjusted dynamic light scaling factor based on the motion level. The method may include determining a distortion level of the video information and providing the initial dynamic light scaling factor to achieve a target distortion level. Determining motion level may include any combination of measuring displacement of motion vector information, measuring a relative amount of intraframe coded information, determining scene changes, etc. The method may include determining available power and providing the adjusted dynamic light scaling factor based on the initial dynamic light scaling factor, the motion level, and available power. The method may include compensating luminance of the video information using the adjusted dynamic light scaling factor. The method may include scaling a backlight of a display using the adjusted dynamic light scaling factor.

At least one benefit of a video adjustment system, an electronic video device, or a method implemented according to at least one embodiment as described herein is to improve visual quality of displayed video information particularly during high motion levels and/or scene changes.

Although the present invention has been described in considerable detail with reference to certain preferred versions thereof, other versions and variations are possible and contemplated. For example, circuits or modules described herein may be implemented as an combination of discrete circuitry, logic, integrated circuitry, software, firmware, etc. The present invention applies generally to any type of video information, such as video (e.g. MPEG and the like), or image sequencing, such as, for example, JPEG, MJPEG, JPEG2000, MJPEG2000, etc. The term "video information" as used herein is intended to apply to any video or image sequence information. Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

The invention claimed is:

1. A video adjustment system for processing video information, comprising:
   a controller which provides a power level value;
   a motion analyzer which determines a motion level metric of the video information based on at least one motion parameter, wherein said motion level metric is indicative of a relative level of motion; and
   an adjustment module which combines a factor of said power level value and said motion level metric with an initial dynamic light scaling factor to provide an adjusted dynamic light scaling factor.

2. The video adjustment system of claim 1, wherein said motion analyzer determines said motion level metric based on motion vector information.

3. The video adjustment system of claim 1, wherein said motion analyzer determines said motion level metric based on detecting a scene change.

4. The video adjustment system of claim 1, wherein said motion analyzer determines said motion level metric based on a percentage of intraframe coded video blocks of a video frame.

5. The video adjustment system of claim 1, wherein said adjustment module subtracts an incremental scaling value from said initial dynamic light scaling factor if motion is above a predetermined threshold or if a scene change is detected.

6. The video adjustment system of claim 1, further comprising a distortion module which performs distortion evaluation of the video information for calculating said initial dynamic light scaling factor based on a target distortion metric.

7. The video adjustment system of claim 1, wherein said distortion module comprises a memory which stores a plurality of predetermined scaling factors based on statistical distortion level characterization in which one of said plurality of predetermined scaling factors is selected as said initial dynamic light scaling factor by a target distortion metric.

8. An electronic video device, comprising:
   a controller which provides a power level value;
   a video processing system which provides motion level information associated with video information, wherein said motion level information indicates a relative amount of motion;
   a video adjustment system which determines a dynamic light scaling factor based on a target distortion metric, said motion level information and said power level value, wherein said video adjustment system uses said target distortion metric to determine an initial dynamic light scaling factor, and adjusts said dynamic light scaling factor by combining a factor of said power level value and said motion level information with said initial dynamic light scaling factor; and
   a display system which displays adjusted video information which is adjusted based on said dynamic light scaling factor.

9. The electronic video device of claim 8, wherein said video adjustment system comprises:
   a distortion module which determines said initial dynamic light scaling factor for said video information based on said target distortion metric;
   a motion analyzer which determines a motion metric of said video information based on said motion level information; and
   an adjustment module which provides an adjusted dynamic light scaling factor based on said initial dynamic light scaling factor and said motion metric.

10. The electronic video device of claim 9,
   wherein said adjustment module determines said adjusted dynamic light scaling factor by subtracting a factor of said power level value and said motion metric from said initial scaling factor.

11. The electronic video device of claim 8, wherein said motion level information comprises motion vector information.

12. The electronic video device of claim 8, wherein said motion level information comprises an indication of a scene change.

13. The electronic video device of claim 8, wherein said display system comprises:
   a luminance compensator which adjusts luminance of said video information based on said dynamic light scaling factor; and
   a backlight unit which adjusts backlight power based on said dynamic light scaling factor.

14. The electronic video device of claim 8, wherein said video adjustment system comprises a lookup table of stored scaling factors predetermined by statistical distortion level characterization of test images.

15. A method of processing video information, comprising:
   determining available power and providing a power level value;
   determining a motion level of the video information indicative of the relative amount of motion and providing a motion metric; and
   combining an initial dynamic light scaling factor with a factor of said power level value and said motion level metric to provide an adjusted dynamic light scaling factor.

16. The method of claim 15, further comprising determining a distortion level of the video information and providing the initial dynamic light scaling factor to achieve a target distortion level.

17. The method of claim 15, wherein said determining a motion level comprises measuring displacement of motion vector information.

18. The method of claim 15, wherein said determining a motion level comprises measuring a relative amount of intraframe coded information.

19. The method of claim 15, further comprising compensating luminance of the video information using the adjusted dynamic light scaling factor.

20. The method of claim 15, further comprising scaling a backlight of a display using the adjusted dynamic light scaling factor.

21. The video adjustment system of claim 1, wherein said adjustment module multiplies a first factor, an incremental scaling factor step size, said power level value and said motion level metric together to provide an adjustment value, and subtracts said adjustment value from said initial dynamic light scaling factor to provide said adjusted dynamic light scaling factor.

* * * * *